(12) United States Patent
Huang et al.

(10) Patent No.: US 6,511,694 B2
(45) Date of Patent: Jan. 28, 2003

(54) STABLE SOFT FROZEN DESSERTS

(75) Inventors: Victor Tsangmin Huang, Moundsview, MN (US); Diane Rae Rosenwald, Plymouth, MN (US); Eric David Harcourt, Eagan, MN (US)

(73) Assignee: The Pillsbury Company, Minneapolis, MN (US)

( * ) Notice: Subject to any disclaimer, the term of this patent is extended or adjusted under 35 U.S.C. 154(b) by 47 days.

(21) Appl. No.: 09/828,521

(22) Filed: Apr. 6, 2001

(65) Prior Publication Data

US 2003/0003215 A1 Jan. 2, 2003

(51) Int. Cl.[7] .............................. A23G 9/00; A23G 9/02; A23G 9/20
(52) U.S. Cl. ........................................ 426/565; 426/567
(58) Field of Search .................................. 426/565, 567

(56) References Cited

U.S. PATENT DOCUMENTS

| | | | |
|---|---|---|---|
| 3,335,013 A | 8/1967 | Wolfmeyer ................... 99/136 |
| 3,345,185 A | 10/1967 | Pisani et al. ................... 99/136 |
| 3,510,316 A | 5/1970 | Decker ........................ 99/136 |
| 3,565,765 A | 2/1971 | Heady et al. ................. 195/31 |
| 3,949,102 A | 4/1976 | Hellyer et al. ............... 426/566 |
| 4,219,581 A | 8/1980 | Dea et al. ................... 426/565 |
| 4,244,977 A | 1/1981 | Kahn et al. ............... 426/330.2 |
| 4,282,262 A | 8/1981 | Blake ......................... 426/565 |
| 4,346,120 A | 8/1982 | Morley et al. ............... 426/565 |
| 4,374,154 A | 2/1983 | Cole et al. ................... 426/565 |
| 4,376,791 A | 3/1983 | Holbrook et al. ............ 426/565 |
| 4,400,405 A | 8/1983 | Morley et al. ............... 426/565 |
| 4,400,406 A | 8/1983 | Morley et al. ............... 426/565 |
| 4,427,701 A | 1/1984 | Morley ........................ 426/36 |
| 4,434,186 A * | 2/1984 | Desia et al. ................. 426/565 |
| 4,452,824 A | 6/1984 | Cole et al. ................... 426/565 |
| 4,497,841 A | 2/1985 | Wudel et al. ................ 426/565 |
| 4,542,035 A | 9/1985 | Huang et al. ................ 426/565 |
| 4,724,153 A | 2/1988 | Dulin et al. ................. 426/565 |
| 4,737,374 A | 4/1988 | Huber et al. ................. 426/565 |
| 4,826,656 A | 5/1989 | Huber et al. ................. 426/565 |
| 4,840,813 A | 6/1989 | Greenberg et al. ........... 426/565 |
| 5,082,682 A | 1/1992 | Peterson ...................... 426/565 |
| 5,112,626 A | 5/1992 | Huang et al. ................ 426/565 |
| 5,171,602 A | 12/1992 | Martin et al. ................ 426/565 |
| 5,175,013 A | 12/1992 | Huang et al. ................ 426/565 |
| 5,215,776 A | 6/1993 | Peterson ...................... 426/565 |
| 5,256,436 A | 10/1993 | Malone et al. .............. 426/566 |
| 5,328,710 A | 7/1994 | Malone et al. .............. 426/565 |
| 5,358,728 A | 10/1994 | Martin et al. ................ 426/565 |
| 5,478,587 A | 12/1995 | Mingione .................... 426/565 |
| 5,486,372 A | 1/1996 | Martin et al. ................ 426/565 |
| 5,605,712 A * | 2/1997 | Betrand et al. .............. 426/565 |
| 6,010,734 A | 1/2000 | Whelan et al. .............. 426/565 |
| 6,368,645 B2 * | 4/2002 | Huang et al. ................ 426/565 |

* cited by examiner

*Primary Examiner*—Nina Bhat
(74) *Attorney, Agent, or Firm*—John A. O'Toole; Douglas J. Taylor; Annette M. Frawley

(57) ABSTRACT

The invention relates to a stable soft frozen dessert composition having about 15 to about 35 weight percent of a sweetener composition based on the weight of the frozen dessert composition. The sweetener composition comprises about 30 to about 90 weight percent sucrose and about 10 to about 70 weight percent maltose based on the total weight of the sweetener composition with a ratio of sucrose to maltose (sucrose: maltose) greater than 0.5:1. The compositions can be either dairy or non-dairy and can be regular fat, reduced fat, or non-fat products. The compositions can withstand normal temperature fluctuations during frozen storage without extensive formation of large ice crystals that can be detrimental to the product.

21 Claims, No Drawings

STABLE SOFT FROZEN DESSERTS

FIELD OF THE INVENTION invention relates to soft frozen desserts that can be stored for extended periods of time and that include a sweetener composition comprising sucrose and maltose.

BACKGROUND OF THE INVENTION

Frozen dessert products such as ice cream, ice milk, gelato, milk shakes, frozen yogurt, sherbet, pudding, and sorbet have wide consumer appeal. Some frozen dessert products such as milk shakes and "soft serve" products derive at least part of their consumer appeal from their soft texture. To deliver a pleasing product to consumers, frozen desserts should be resistant to changes resulting from heat shock during shipping, handling, and storage. Heat shock arises from either cyclic change in temperature causing partial thawing and refreezing of the product or elevated temperatures over an extended period of time. Heat shock can affect frozen desserts at temperatures well below the freezing point of pure water because some of the water in frozen desserts is not frozen at typical storage temperatures. Heat shock promotes ice crystal growth that imparts a gritty texture to the dessert product. Heat shock frequently also produces a separation of the syrupy aqueous phase from the air and fat matrix that ultimately makes the appearance and texture of the product unacceptable. The gritty texture and diminished appearance detract from the general quality of the product. It has been particularly challenging to deliver frozen dessert products that are both resistant to heat shock and soft.

Stabilizing gums have been added in an attempt to improve the heat shock stability of frozen desserts. Examples of stabilizing gums that have traditionally been added to ice cream include gum acacia, guar gum, locust bean gum, carrageenan, xanthan gum, alginate, pectin, and the like. Microcrystalline cellulose and carboxymethylcellulose are often used in combination with stabilizing gums to modify mouth feel. Hydrocolloidal stabilizers function to reduce the diffusion of water molecules and, therefore, to help prevent the formation of large ice crystals.

Although the gums improve stability, they have several drawbacks. The quantity of stabilizing gums required for effective heat shock stability often results in a frozen dessert product that has an unacceptable slick or gummy mouth feel. Although stabilizing gums are often derived from naturally produced substances, consumers tend to perceive a product that contains gums as one that contains artificial rather than natural ingredients. The gums also tend to make the frozen dessert harder. Hardness affects other properties of the frozen dessert such as, for example, ease of extrusion into containers and scooping.

While high molecular weight hydrocolloids are used to improve the heat shock stability of frozen desserts, lower molecular weight sweetener compositions have been used to improve the softness of frozen desserts. One approach to improving the softness of frozen desserts has been to increase the amount of sucrose added relative to the amount of fat or water in the product. However, the large amount of sucrose required for acceptable softness often results in a taste that is too sweet.

The use of sucrose in combination with corn syrup is known for frozen desserts. Corn syrup solids tend to be less sweet than sucrose and depress the freezing point less. Corn syrup is commercially available with various dextrose concentrations. If the dextrose content is too high, the product can cause a throat burning sensation when consumed.

Fructose, a monosaccharide, can also be used to replace some of the sucrose, a disaccharide, in frozen desserts. However, large amounts of monosaccharide can depress the freezing point to such an extent that ice crystals fail to form and the product is runny.

Still another approach to softness improvement has been to increase the amount of incorporated air and thereby decrease the amount of water per unit volume that can freeze. This attempt not only results in a texture that is more characteristic of a whipped topping than of a frozen dessert like ice cream, but is also limited by the applicable standards of identity relating to required weight per volume and solids content of the various frozen dessert products. High overrun frozen desserts can also lack foam stability, resulting in collapse and containers that appear to be underfilled.

As a result of the difficulty of producing frozen dessert products that are both stable and soft, soft frozen desserts are typically manufactured locally and sold for immediate consumption. Soft frozen desserts are usually dispensed at temperatures between 16° F. (−9° C.) and 24° F. (−4° C.). Many soft frozen products become hard if stored at about −15° F. (−26° C.), the temperature used for the storage and distribution of the majority of other frozen desserts. It would be advantageous if a soft frozen dessert could be delivered to consumers through the extensive network of frozen food storage, distribution, and retailing facilities that exists nationwide at temperatures close to −15° F. (−26° C.).

SUMMARY OF THE INVENTION

The invention provides frozen dessert compositions and methods for making such compositions. In particular, the invention provides frozen dessert composition containing a sweetener composition comprising maltose and sucrose. As used herein, the term "sweetener composition" refers to all the saccharides except lactose present in a frozen dessert composition such as monosaccharides, disaccharides, trisaccharides, and saccharides with higher degrees of polymerization. Maltose and sucrose are both disaccharides.

The invention provides a frozen dessert composition containing about 15 to about 35 weight percent of a sweetener composition based on the weight of the frozen dessert. The sweetener composition comprises about 30 to about 90 weight percent sucrose and about 10 to about 70 weight percent maltose based on the total weight of the sweetener composition with a sucrose to maltose ratio (sucrose:maltose) of at least 0.5:1. In other embodiments, the sucrose to maltose ratio is at least 1:1 or at least 1.5:1. The desserts can be either dairy or non-dairy and can be regular fat, reduced fat, or non-fat products. The products include, for example, ice cream, ice milk, gelato, milk shakes, frozen yogurt, pudding, sherbet and sorbet.

Another aspect of the invention provides a frozen dessert composition containing about 5 to about 15 weight percent non-fat milk solids and about 15 to about 35 weight percent of a sweetener composition based on the total weight of the frozen dessert. The sweetener composition contains about 30 to about 90 weight percent sucrose and about 10 to about 70 weight percent maltose based on the total weight of the sweetener composition with a sucrose to maltose ratio (sucrose: maltose) of at least 0.5:1. In other embodiments, the sucrose to maltose ratio is at least 1:1 or at least 1.5:1. The frozen dessert composition can be used to prepare a variety of regular fat, low fat, or non-fat dairy products.

In still another aspect of the invention, a frozen dessert composition is provided that contains about 0.5 to about 25 weight percent fat, about 5 to about 15 weight percent non-fat milk solids, and about 15 to about 35 weight percent of a sweetener composition based on the total weight of the frozen dessert. The sweetener composition contains about 30 to about 90 weight percent sucrose and about 10 to about 70 weight percent maltose based on the total weight of the sweetener composition with a sucrose to maltose ratio (sucrose: maltose) of at least 0.5:1. In other embodiments, the sucrose to maltose ratio is at least 1:1 or at least 1.5:1. The frozen dessert composition can be used to prepare a variety of low or regular fat containing dairy products.

Yet another aspect of the invention provides a frozen dessert composition containing condensed skim milk, heavy cream, sucrose, high maltose corn syrup, egg yolk, flavoring agent, and water in an amount to provide total percent solids of about 45 to about 55 weight percent based on the total weight of the frozen dessert. According to this embodiment, the frozen dessert composition contains about 5 to about 20 weight percent sucrose. The high maltose corn syrup is added in an amount to provide about 2 to about 11 weight percent maltose based on the total weight of the frozen dessert composition. The ratio of sucrose to maltose (sucrose:maltose) is at least 0.5:1. In other embodiments, the sucrose to maltose ratio is at least 1:1 or at least 1.5:1.

The invention also provides a method for making a frozen dessert comprising the steps of (1) forming a frozen dessert composition containing about 15 to about 25 weight percent sweetener composition based on the weight of the frozen dessert; (2) freezing the frozen dessert composition; and (3) aerating the mixture to produce a product with an overrun not more than about 100% based on the volume of the frozen dessert. The method of making a frozen dessert can further comprise a spray-drying step. In such a method, the spray-dried material can be reconstituted later and aerated to produce a frozen dessert product. The sweetener composition comprises about 30 to about 90 weight percent sucrose and about 10 to about 70 weight percent maltose based on the total weight of the sweetener composition. The ratio of sucrose to maltose (sucrose: maltose) is at least 0.5:1. In other embodiments, the sucrose to maltose ratio is at least 1:1 or at least 1.5:1.

DETAILED DESCRIPTION OF THE INVENTION

The invention provides frozen dessert compositions and methods of making such compositions. In particular, the invention provides frozen dessert compositions containing a sweetener composition comprising maltose and sucrose. The frozen dessert compositions can typically withstand normal temperature fluctuations during frozen storage without extensive formation of large ice crystals that can be detrimental to the product.

The invention provides a frozen dessert composition containing about 15 to about 35 weight percent sweetener composition. The sweetener composition comprises about 30 to about 90 weight percent sucrose and about 10 to about 70 weight percent maltose based on the total weight of the sweetener composition. The ratio of sucrose to maltose (sucrose: maltose) is at least 0.5:1. In other embodiments, the sucrose to maltose ratio is at least 1:1 or at least 1.5:1. The frozen desserts can be either dairy or non-dairy products and can be regular fat, reduced fat, or non-fat products. The desserts include, for example, ice cream, ice milk, gelato, milk shakes, frozen yogurt, pudding, sherbet, and sorbet.

The frozen desserts of the invention are stable. As used herein, "stable" refers to a frozen dessert with a slow ice crystal growth rate at the temperatures typically used for thermal stress shelf life testing. Ice crystals in a stable frozen dessert are typically less than 100 micrometers and preferably less than 85 micrometers in equivalent circular diameter as measured by image analysis after 4 days at 20° F. (−7° C.).

The frozen desserts of the invention are soft. As used herein, "soft" refers to a frozen dessert that is easily manipulated or penetrated. For purposes of this invention, a soft dessert is one that can be penetrated at least 13 mm in 5 seconds at 10 ° F. (−12° C.) using a weight of 45 grams as defined by AOCS Official Method Cc 16–60, Consistency Penetrometer Method (reapproved 1997).

The compositions are substantially free of stabilizing gums. As used herein, "substantially free" means that the compound is not intentionally added to the composition but a small amount can be present as a minor component of another ingredient. Stabilizing gums tend to make a frozen dessert product hard. Ingredients such as cultured milk can contain exocellular polysaccharides that could function in a manner similar to stabilizing gums. Fruits contain pectin, another polysaccharide that could function like a stabilizer. The concentration of the naturally occurring compounds that function like stabilizers is less than about 1% in the frozen dessert composition.

The compositions are substantially free of sugar alcohols. Sugar alcohols are compounds such as sorbitol, glycerol, propylene glycol, and mannitol that are formed from the hydrogenation of an aldehyde group in a sugar. Use of large amounts of sugar alcohols tends to produce soft frozen desserts but depress the freezing point of the product more than sucrose and maltose resulting in unstable products. Fruits contain sugar alcohols. The concentration of the sugar alcohol is less than about 1% in the frozen dessert composition.

The sweetener composition comprises sucrose and maltose. The sucrose can be, for example, crystalline sucrose, powdered sugar, liquid sugar, or a combination thereof. The maltose can be, for example, crystalline maltose, high maltose corn syrup, or a combination thereof. High maltose corn syrup is typically the maltose source. The maltose content of the high maltose corn syrup is typically at least 25 weight percent based on the dry weight of the maltose corn syrup. In some embodiments, the high maltose corn syrup is about 50 to about 73 weight percent maltose on a dry weight basis. The total solids in a high maltose corn syrup are typically from about 70 to about 82 weight percent. Dry or dehydrated high maltose corn syrup can also be used as the maltose source.

The sweetener composition can optionally contain other saccharides such as dextrose, fructose, trisaccharides, and polysaccharides. These other saccharides can be present, for example, in the maltose corn syrup, in fruit added to the frozen dessert for flavoring purposes, or in the non-fat milk solids added to prepare a dairy product.

The dextrose content in the sweetener composition is typically less than about 4 weight percent. In some embodiments, the dextrose content is less than about 2 weight percent. A low dextrose concentration minimizes the sensation of a burning throat upon consumption of the frozen dessert.

The fructose content in the sweetener composition depends on the flavoring chosen for the product. For example, strawberry flavored products tend to have high fructose levels because strawberries are particularly high in fructose. In contrast, non-fruit flavored products typically do not contain fructose.

The trisaccharide and polysaccharide contents of the sweetener composition are typically less than about 11 and 22 weight percent respectively. In some embodiments, the polysaccharide content is less than about 14 weight percent. The presence of higher molecular weight saccharides, molecules with a molecular weight greater than 500, tends to increase the hardness of the frozen dessert.

The high maltose corn syrup usually contains other saccharides in addition to maltose. The concentration of dextrose is typically less than about 12 weight percent and preferably less than about 6 weight percent based on the total weight of the maltose corn syrup solids. The trisaccharide content is typically about 12 to about 20 weight percent based on the total weight of the maltose corn syrup solids. Polysaccharides, molecules with more than 3 saccharide units and having a molecular weight greater than about 500, are typically present in an amount less than about 32 weight percent based on the total weight of the maltose corn syrup solids. In some embodiments, the concentration of polysaccharides is from about 8 to about 20 weight percent based on the total weight of the maltose corn syrup solids.

The softness of the frozen dessert is related to the freezing point of the product and is affected by the composition of the sweetener composition. Freezing point depression is a colligative property. Thus, freezing point depression depends on the moles of solute in the solution. A monosaccharide can contribute almost twice as much to the freezing point depression as an identical weight of a disaccharide. Likewise, a trisaccharide contributes only two-thirds as much to the freezing point depression as an identical weight of a disaccharide. Other components of the frozen dessert composition such as low molecular weight salts in milk or cream and flavorants containing low molecular weight materials such as ethanol can contribute to the freezing point depression of the composition. Salts are particularly effective because they disassociate as they dissolve, providing two moles of ions for every mole of salt.

Frozen desserts can have both a fat and an aqueous phase but only the aqueous phase ingredients are used to calculate the freezing point depression. The calculation is performed by first multiplying the percent weight of each ingredient in the frozen dessert composition that is the aqueous phase solute (all components that are not fat or water) by the sucrose equivalence. These values are summed and then divided by the percent weight of the aqueous phase of the frozen dessert composition (all the components that are not fat). The sucrose equivalent of each aqueous phase solute is determined by dividing the molecular weight of sucrose by the molecular weight of the aqueous phase solute. For example, a mole of maltose and sucrose each weigh 342 g so the sucrose equivalent for maltose is 342/342 or 1.0. On the other hand, a mole of dextrose weighs 180 g so the sucrose equivalent for dextrose is 342/180 or 1.9.

The freezing point depression of the aqueous phase is typically between about 37 and 43 sucrose equivalents. If the freezing point depression contributed by the sweetener composition is below about 37, the product is too hard. A sweetener composition with a freezing point depression above 43 typically contains high levels of monosaccharide or other low molecular weight materials such as sugar alcohols and produces a frozen dessert that is not stable.

The frozen dessert can be aerated to increase the softness of the product. Generally, softness is directly related to the overrun. As used herein, "overrun" refers to the volume increase of the product after aeration. To some extent, the amount of overrun is controlled by consumer preference and the various standards of identity for frozen dessert products. The overrun of the invention is typically not greater than 100 percent. In some embodiments, the overrun is from about 5 to about 50 percent or from about 5 to about 25 percent.

Another aspect of the invention provides a frozen dessert composition comprising about 5 to about 15 weight percent nonfat milk solids and about 15 to about 35 weight percent of a sweetener composition based on the total weight of the frozen dessert. The sweetener composition comprises about 30 to about 90 weight percent sucrose and about 10 to about 70 weight percent maltose based on the total weight of the sweetener composition with a sucrose to maltose ratio (sucrose: maltose) of at least 0.5:1. In other embodiments, the sucrose to maltose ratio is at least 1:1 or at least 1.5:1. A variety of frozen dessert products can be prepared including regular fat, reduced fat, or non-fat dairy products such as, for example, ice cream, ice milk, milk shakes, frozen yogurt, pudding, and gelato.

The nonfat milk solids affect the ability of the frozen dessert product to be whipped. Additionally, the frozen dessert's smoothness, body, mouth feel, melt resistance, and freezing point are affected by the nonfat milk solids content. Nonfat milk solids decrease sensitivity to temperature fluctuations and increase stability of a frozen product. The concentration of nonfat milk solids is typically from about 5 to about 15 weight percent. In another embodiment, the nonfat milk solids is from about 7 to about 11 weight percent based on the total weight of the frozen dessert.

The nonfat milk solids can include, for example, lactose, protein, and minerals such as calcium. Typical sources include cream, buttermilk, whole milk, non-fat dry milk, half and half, and the like. Milk includes, for example, condensed milk, skim milk, condensed skim milk, dried milk, lactose-reduced skim milk, or a combination thereof. The skim milk can be ultra-filtered to concentrate the amount of protein in the milk. Ultra-filtered skim milk typically concentrates the protein by a factor of about five (5×skim milk). The milk can come from, for example, cows, goats, or sheep. Some sources of the milk solids are also high in fat such as, for example, heavy cream. In some embodiments, such sources cannot provide the desired amounts of nonfat milk solids without being added in combination with a another source such as, for example, condensed skim milk, dried milk proteins, nonfat dry milk, casein, or whey.

The total protein in the frozen dessert composition is typically from about 3 to about 6 weight percent based on the total weight of the frozen dessert. A portion of the nonfat milk solids can be substituted with protein derived from sweet dairy whey, neutralized acid whey, modified whey, whey protein concentrate, casein, modified casein, soy flour, modified soy flour, soy protein concentrate, soy, egg protein, peanut flour, and peanut protein concentrate.

In still another aspect of the invention, a frozen dessert composition is provided that comprises about 0.5 to about 25 weight percent fat, about 5 to about 15 weight nonfat milk solids, and about 15 to about 35 weight percent sweetener composition based on the total weight of the frozen dessert. The sweetener composition comprises about 30 to about 90 weight percent sucrose and about 10 to about 70 weight percent maltose based on the total weight of the sweetener composition with a sucrose to maltose ratio (sucrose: maltose) of at least 0.5:1. In other embodiments, the sucrose to maltose ratio is at least 1:1 or at least 1.5:1. The frozen dessert composition can be used to prepare a variety of low or high fat dairy products such as, for example, ice cream, ice milk, gelato, milk shakes, frozen yogurt, and gelato.

The amount of fat varies depending on the product being prepared and the particular organoleptic properties desired. A low fat product typically has about 0.5 to about 3 weight percent fat based on the total weight of the frozen dessert. Sherbet, for example, typically has a fat content between about 1 and 3 percent. On the other hand, economy ice cream typically has about 10 to 12 percent fat, premium ice cream has about 12 to 14 percent fat, and super premium ice cream has over 15 percent fat. The amount of fat stated in these products is only exemplary.

The fat constituent provides a creamy taste and contributes to the smoothness, body and melting resistance of the frozen dessert. Depending on the particular fat source chosen, it can also contribute to the amount of nonfat milk solids, sweetener composition, and flavoring solids. Dairy cream, butterfat, and milk are typical fat sources but other edible fats and oils can be used. Fats can be contributed from egg yolks and flavorants. Vegetable oils that can be used include, for example, cottonseed oil, soybean oil, corn oil, sunflower oil, palm oil, rice oil, peanut oil, safflower oil, and coconut oil. The oils and fats can be unsaturated, saturated, or partially saturated. In one embodiment, heavy cream and egg yolks provide the fat source.

Yet another aspect of the invention provides a frozen dessert composition comprising condensed skim milk, heavy cream, sucrose, high maltose corn syrup, egg yolk, flavoring agent, and water in an amount to provide total percent solids of about 45 to about 55 weight percent based on the total weight of the frozen dessert. The composition can further comprise skim milk. The term "solids" can include nonfat milk solids, fat, sweetener composition, egg solids, flavoring solids, and the like.

The condensed skim milk in this aspect of the invention is typically from about 25 to about 35 weight percent based on the total weight of the frozen dessert composition. In another embodiment, the condensed skim milk is from about 25 to 30 weight percent based on the total weight of the frozen dessert. Condensed skim milk usually contains about 32 weight percent solids. The condensed milk is a source of protein and contributes to the non-fat milk solids.

The heavy cream in this aspect of the invention is typically from about 34 to about 40 weight percent based on the total weight of the frozen dessert composition. In another embodiment, the heavy cream is from about 37 to about 40 weight percent based on the total weight of the frozen dessert. Heavy cream typically contains about 40 weight percent fat and about 45 weight percent total solids.

In this aspect of the invention, the sweetener composition is primarily derived from sucrose and high maltose corn syrup. The sucrose is present in an amount from about 5 to about 20 weight percent based on the total weight of the frozen dessert composition. The high maltose corn syrup is added in an amount to provide about 2 to about 11 weight percent maltose based on the weight of the frozen dessert. For exemplary purposes, if the maltose content of the high maltose corn syrup is about 65 weight percent maltose with 81 weight percent solids, then the frozen dessert composition can have about 4 to about 21 weight percent of the syrup. On the other hand, if the maltose content of the high maltose corn syrup is about 32 weight percent maltose with 81 weight percent solids, the frozen dessert composition can have about 8 to about 42 weight percent of the syrup.

Egg yolks can improve the texture, whipping ability, and hardness of the frozen dessert. Suitable sources of egg yolk solids include liquid egg yolks, frozen egg yolks, dried egg yolks, liquid whole eggs, frozen whole eggs, dried whole eggs, or a combination thereof. Liquid frozen egg yolk is often sold for commercial purposes with about 10% sucrose added. The sucrose improves the stability of the eggs when heated, such as when a frozen dessert composition is pasteurized. Egg yolks can help emulsify the components and include about 20 weight percent to about 24 weight percent fat, typically about 22 weight percent fat. The egg yolk concentration in this aspect of the invention is typically less than about 6 weight percent and preferably less than about 4.5 weight percent based on the total weight of the frozen dessert composition.

The frozen dessert can also include flavorants such as, for example, vanilla, chocolate, coffee, fruit, nut, liqueur, vegetable, tea, and candy. These flavorants can be provided in the form of a powder, puree, paste, syrup, concentrate, alcohol, liquid, solid, or a combination thereof. The flavorant choice can affect the amount of sweetener composition added to the frozen dessert. For example, a fruit-flavored product contains a high level of fructose. Likewise, the flavorant can affect the amount of fat added because some flavorant such as nuts, for example, are high in fat.

Typically, water is present as a dispersion media for the other ingredients. The portion of water that is not frozen provides fluidity for the product. The portion that freezes forms ice crystals resulting in product rigidity and the refreshing taste perception characteristic of a frozen dessert. The source of water for the frozen dessert product can be added water or moisture from other fluid ingredients such as those used to supply the nonfat milk solids. The total solids should not exceed an amount that would result in a frozen dessert composition that is so viscous that it cannot be processed or a frozen dessert product that has an undesirable texture.

The invention also provides a method for making a frozen dessert comprising the steps of (1) forming a frozen dessert composition containing about 15 to about 35 weight percent of a sweetener composition based on the weight of the frozen dessert composition; (2) freezing the frozen dessert composition; and (3) aerating the frozen dessert composition to produce a frozen dessert product with an overrun not greater than 100% based on the volume of the frozen dessert composition. The sweetener composition comprises about 30 to about 90 weight percent sucrose and about 10 to about 70 weight percent maltose based on the total weight of the sweetener composition with a ratio of sucrose to maltose (sucrose: maltose) is at least 0.5:1. In other embodiments, the sucrose to maltose ratio is at least 1:1 or at least 1.5:1. The method of preparing a frozen dessert can further comprise a spray-drying step. The frozen dessert composition can be spray-dried using any suitable method.

One embodiment of the invention is a method to prepare ice cream. Ice cream can be prepared by initially mixing together, for example, condensed milk, cream, skim milk, egg yolk, sucrose, and high maltose corn syrup. Ingredients in liquid form are commonly used to facilitate blending, although dry ingredients can be used.

The mixture is typically pasteurized and then homogenized. Pasteurization can be by batch method, high temperature short time (HTST) method, or any suitable method. For example, pasteurization by HTST can be accomplished by heating the mixture at about 180° F. (82° C.) for less than one minute. The mixture can be homogenized according to any suitable method. For example, the mixture can be homogenized in stages such as, for example, a first stage at about 1500 psi and a second stage at about 500 psi.

The mixture is typically cooled to less than 45° F. (7° C.). In one embodiment, the mixture is cooled from about 36° F.

(2° C.) to about 38° F. (3° C.). After cooling, the mixture is aged. Agi involves holding the mixture for a period of time sufficient to produce the physical changes in protein structure and fat crystallization that result in a more consistent and more easily processed mixture. When desired, other ingredients such as vanilla, condiments, flavoring and coloring are then added and the mixture is stirred until all the ingredients are thoroughly blended. The mixtures can be placed into a standard ice cream freezer, agitated to provide an overrun of about 20–100%, and extruded at about 18° F. to 24° F. (−8° C. to 4° C.). The aerated desserts in containers and hardened in a −45° F. (−43° C.) freezer for about 1 to 2 hours prior to warehousing.

Ice cream products prepared in accordance with the invention are soft. A weight of 45 grams can typically penetrate at least 13 mm into such a product in a time span of 5 seconds when the ice cream is at 10° F. (−12° C.). In other embodiments, the same weight can penetrate at least 15 or 17 mm into an ice cream product held at 10° F. (−12° C.).

Preparation of frozen desserts in accordance with the invention results in products that have sufficient stability to retain their desired organoleptic properties for at least 52 weeks at conditions that are normally encountered in typical −15° F. (−26° C.) frozen dessert storage, distribution, and retailing systems. As a result, the products can be manufactured in a relatively few plants and distributed nationally or internationally using the same facilities as other frozen dessert items.

The following examples further describe the various compositions and methods of the invention. The examples are provided for exemplary purposes to facilitate understanding of the inventions and should not be considered to limit the invention to the examples.

EXAMPLES

Protocol for Preparing Ice Cream

Frozen aerated ice creams were prepared by mixing together the ingredients to make 125 pound batches. All the ingredients except vanilla were placed in a blend tank and stirred until the mixture was thoroughly blended. Any size tank that can hold the ingredients and any method of mixing known in the art can be used.

The mixture was pasteurized by high temperature short time (HTST) pasteurization at about 180° F. (82° C.) for 53 seconds followed by two-stage homogenization at about 1500 psi during the first stage and about 500 psi during the second stage.

The mixture was then cooled to about 40° F. (4° C.). The vanilla was added. The dessert mixture was held (aged) for about 4–16 hours at about 40° F. (4° C.), placed into a standard ice cream freezer, agitated to provide an overrun of about 20–40%, and extruded at about 18° F. to 24° F. (−8° C. to 4° C.). The aerated dessert was then placed in a container and hardened in a −45° F. −43° C.) freezer for about 1 to 2 hours.

Examples 1 and 2

Soft and Stable Ice Cream Compositions

Examples 1 and 2 were frozen dessert compositions prepared within the range of the invention. The formulations are shown in Table 1. The amount of each ingredient is reported as a weight percent based on the total weight of the ice cream composition.

TABLE 1

Ingredients of Examples 1 and 2

| Ingredient | Example 1 | Example 2 |
|---|---|---|
| Condensed skim milk | 25.50 | 25.75 |
| 5X ultrafiltered skim milk | 0 | 5.00 |
| Cream, 40% fat | 39.05 | 39.05 |
| Crystalline sucrose | 10.95 | 13.75 |
| Egg yolk with 10% sucrose | 4.85 | 4.85 |
| Water | 5.85 | 5.05 |
| 65% HMCS (80% solids) | 13.50 | 6.25 |
| Vanilla Extract | 0.30 | 0.30 |
| Total solids | 50.11 | 48.23 |

The composition of the ice cream is shown in Table 2 for Examples 1 and 2. The amounts are reported as weight percents based on the total weight of the ice cream composition.

TABLE 2

Composition of Examples 1 and 2

| Component | Example 1 | Example 2 |
|---|---|---|
| Total sweetener composition | 22.37 | 19.29 |
| Sucrose | 11.44 | 14.24 |
| Maltose | 7.11 | 3.29 |
| Dextrose | 0.44 | 0.20 |
| Trisaccharides | 1.64 | 0.76 |
| Polysaccharides | 1.75 | 0.81 |
| Sucrose: maltose ratio | 1.61 | 4.33 |
| Milk solids (non-fat) | 10.19 | 11.37 |
| Fat | 16.84 | 16.85 |

Example 1 contains 51 weight percent sucrose and 32 weight percent maltose based on the total weight of the sweetener composition. Example 2 contains 74 weight percent sucrose and 17 weight percent maltose based on the total weight of the sweetener composition. The freezing point depressions in sucrose equivalents were 39 for Example 1 and 37 for Example 2.

Comparative Example 1

Stable But Hard Ice Cream

Comparative Example 1 was prepared using the formulations shown in Table 3. The formulation is outside the range of the invention. The amount of each ingredient is reported as a weight percent based on the total weight of the ice cream composition.

TABLE 3

Ingredients of Comparative Example 1

| Ingredient | Comparative Example 1 |
|---|---|
| Condensed skim milk | 25.06 |
| Cream, 40% fat | 39.00 |
| Egg yolk with 10% sucrose | 4.85 |
| Crystalline sucrose | 13.97 |
| Water | 16.47 |
| 65% HMCS (80% solids) | 0 |
| Vanilla Extract | 0.65 |
| Total solids | 42.03 |

The composition of the ice cream is shown in Table 4 for Comparative Example 1. The amounts are reported as weight percents based on the total weight of the ice cream composition.

TABLE 4

Composition of Comparative Example 1

| Component | Comparative Example 1 |
|---|---|
| Total sweetener composition | 14.46 |
| Sucrose | 14.46 |
| Maltose | 0 |
| Dextrose | 0 |
| Trisaccharides | 0 |
| Polysaccharides | 0 |
| Sucrose: maltose ratio | Not applicable |
| Nonfat milk solids | 10.05 |
| Fat | 16.81 |

The freezing point depression in sucrose equivalents is 34.

Comparative Example 2

Soft but Unstable Ice Cream

Comparative Example 2 was prepared using the formulations shown in Table 5. The composition is outside the range of the invention. The amount of each ingredient is reported as a weight percent based on the total weight of the ice cream composition.

TABLE 5

Ingredients of Comparative Example 2

| Ingredient | Comparative Example 2 |
|---|---|
| Condensed skim milk | 26.00 |
| Cream, 40% fat | 31.80 |
| Egg yolk with 10% sucrose | 0 |
| Crystalline sucrose | 5.09 |
| Water | 17.84 |
| 65% HMCS (80% solids) | 0 |
| Vanilla Extract | 0.90 |
| Crystalline dextrose | 10.25 |
| Crystalline lactose | 0.50 |
| Ice #2 Emulsifier (mono- and diglycerides, polysorbate 80) | 0.11 |
| Salt | 0.15 |
| CC-305 Gum (locust bean gum, guar gum and carrageenan) | 0.11 |
| Corn syrup 43 DE | 7.20 |
| Total solids | 42.03 |

The emulsifier Ice #2, available from Loders Croklaan, Glen Ellyn, Ill., contains a mixture of monoglycerides, diglycerides, and Polysorbate 80. The CC–305 gum is available from Continental Colloids, Inc., West Chicago, Ill. and is a mixture of locust bean gum, guar gum, and carrageenan. The corn syrup has a dextrose equivalent of 43 and contains 80 percent solids.

The composition of the ice cream is shown in Table 6 for Comparative Example 2. The amounts are reported as weight percents based on the total weight of the ice cream composition.

TABLE 6

Composition of Comparative Example 2

| Component | Comparative Example 2 |
|---|---|
| Total sweetener composition | 5.10 |
| Sucrose | 5.09 |
| Maltose | 0 |
| Dextrose | 9.23 |

TABLE 6-continued

Composition of Comparative Example 2

| Component | Comparative Example 2 |
|---|---|
| Trisaccharides | 0 |
| Polysaccharides | 0 |
| Sucrose: maltose ratio | Not applicable |
| Nonfat milk solids | 9.96 |
| Fat | 12.93 |

The freezing point depression in sucrose equivalents is 52.

Example 3

Test Procedure for Measuring Ice Crystal Sizes

The ice creams prepared as Comparative Examples 1 and 2 as well as Examples 1 and 2 were stored for 4 days at 20° F. (−7° C.). Ice crystal sizes were then measured. Equipment used to perform the test included a Zeiss microscope, manufactured by Carl Zeiss, Inc., of Thornwood, N.Y., equipped with a temperature controlled cold stage, manufactured by Mettler Instrument Corp. of Hightstown, N.J. A thermoelectric stage is preferred.

Frozen composition samples were equilibrated to −20° C. Colder samples were undesirable because they can fracture. Slides, cover slips, mineral oil and utensils were also equilibrated to −20° C. Frozen composition samples were collected from frozen pints of dessert. Samples were removed from the center of the container 1 inch below the dessert surface.

In a freezer chamber at −20° C., a small amount of the sample was placed on the cold microscope slide with a cold spatula. A drop of mineral oil was placed over the sample and a cover slip was placed over the mineral oil. The dessert sample was dispersed into the oil by applying pressure on the cover slip with a cold pencil eraser. The microscope and stage were cooled with liquid nitrogen. The apparatus was enclosed in a plastic bag to prevent moisture from freezing on the lenses of the microscope or the sample slide. The magnification was determined as follows:

| | |
|---|---|
| Magnification | 10 X |
| Objective | 16 X. |
| Camera Eyepiece | 0.8 X. |
| Theoretical Magnification | 128 X |
| Actual | 130.7 X |

Once the stage was equilibrated to −20° C., the slide was quickly transferred from the freezer to the microscope stage. The sample was examined for a field showing a representative distribution of ice crystals. Areas where ice crystals were evenly dispersed and separated were easier to analyze by image analysis or digitizing. Samples and analyses were run in duplicate.

Distributions for equivalent circular diameter were determined by image analysis of the photographs. An automated program was used to detect and measure each ice crystal in the field. The image analysis field was slightly smaller than the photograph. Overlapping ice crystals were not measured by this method. The image analyzer measured the outside edge of contrasting rings that defined the ice crystals. Quality control checks included a magnification check, calibration check, accuracy check and a precision check.

The size of the ice crystals after 4 days of storage at 20° F. (−7° C.) is shown in Table 7. Comparative Example 2 had large ice crystals (128 μm) compared to the other samples (less than 75 μm). Thus, Comparative Example 2, Example 1, and Example 2 are more stable than Comparative Example 1.

TABLE 7

Size of ice crystals after 4 days at 20° F. (−7° C.)

| Sample | Ice crystal size, μm |
|---|---|
| Comparative Example 1 | 66 |
| Comparative Example 2 | 128 |
| Example 1 | 74 |
| Example 2 | 71 |

Example 4

Test Procedure for Measuring Softness

The hardness of the samples was measured at three temperatures using a penetrometer (Precision Scientific; Bellwood, Ill.) accurate to 0.1 millimeter. The testing procedure is described in AOCS Official Method Cc 16–60 (reapproved 1997. The depth of penetration of a metal cone into a sample in 5 seconds using a force of 45 grams was measured. The penetration depth correlated with the softness of the sample. That is, the penetration depth increased as the softness of the sample increased. The penetrometer data is shown in Table 8. Comparative Example 1 was harder than Comparative Example 1, Example 1, and Example 2. Comparative Example 2 was the softest.

TABLE 8

Penetration depth in millimeters

| Sample | 0° F. (−18° C.) | 5° F. (−15° C.) | 10° F. (−12° C.) |
|---|---|---|---|
| Comparative Example 1 | 5.1 | 7.5 | 11.5 |
| Comparative Example 2 | 15.1 | 23.5 | 34.5 |
| Example 1 | 9.3 | 14.7 | 22.6 |
| Example 2 | 8 | 14.4 | 20.5 |

From the foregoing detailed description, it will be evident that modification can be made in the composition and methods of the invention without departing from the spirit or scope of the invention. Therefore, it is intended that all modifications and variations not departing from the spirit of the invention come within the scope of the claims and their equivalents.

We claim:

1. A frozen dessert composition comprising 15 to 35 weight percent of a sweetener composition based on the weight of the frozen dessert composition, wherein said sweetener composition comprises:
   (a) sucrose in an amount from 30 to 90 weight percent based on the total weight of the sweetener composition; and
   (b) maltose in an amount from 10 to 70 weight percent based on the total weight of the sweetener composition, wherein the sweetener composition has a sucrose to maltose ratio of at least 0.5:1.

2. The frozen dessert composition of claim 1, wherein the sucrose to maltose ratio is at least 1:1.

3. The frozen dessert composition of claim 1, wherein the frozen dessert is substantially free of a stabilizing gum.

4. The frozen dessert composition of claim 1, wherein the frozen dessert composition is substantially free of a sugar alcohol.

5. The frozen dessert composition of claim 1, wherein the maltose comprises high maltose corn syrup solids.

6. The frozen dessert composition of claim 1, wherein the frozen dessert composition further comprises 5 to 15 weight percent nonfat milk solids based on the total weight of the frozen dessert composition.

7. The frozen dessert composition of claim 1, wherein the frozen dessert composition further comprises
   fat in an amount from 0.5 to 25 weight percent based on the total weight of the frozen dessert composition; and
   nonfat milk solids in an amount from 5 to 15 weight percent based on the total weight of the frozen dessert composition.

8. The frozen dessert composition of claim 7, wherein the frozen dessert composition has an aqueous phase freezing point depression of 37 to 43 based on sucrose equivalents.

9. The frozen dessert composition of claim 7, wherein the frozen dessert composition contains 45 weight percent to 55 weight percent solids based on the total weight of the frozen dessert composition.

10. The frozen dessert composition of claim 7, wherein the frozen dessert composition has an overrun not greater than 100%.

11. The frozen dessert composition of claim 7, wherein the frozen dessert composition is soft and stable.

12. A frozen dessert composition comprising:
   (a) condensed skim milk in an amount from 25 to 35 weight percent based on the total weight of the frozen dessert composition;
   (b) heavy cream in an amount from 34 to 40 weight percent based on the total weight of the frozen dessert composition;
   (c) sucrose in an amount from 10 to 14 weight percent based on the total weight of the frozen dessert composition;
   (d) high maltose corn syrup to provide maltose in an amount of 2 to 11 weight percent based on the total weight of the frozen dessert composition;
   (e) egg yolk in an amount not greater than 6 weight percent based on the total weight of the frozen dessert composition;
   (f) flavoring agent; and
   (g) water in an amount to provide percent solids of 45 weight percent to 55 weight percent based on the total weight of the frozen dessert composition, wherein the frozen dessert composition has a sucrose to maltose ratio is at least 0.5:1.

13. The frozen dessert composition of claim 12, wherein the sucrose to maltose ratio is at least 1:1.

14. The frozen dessert composition of claim 12, wherein the frozen dessert composition is substantially free from a stabilizing gum.

15. The frozen dessert composition of claim 12, wherein the frozen dessert composition is substantially free from sugar alcohols.

16. The frozen dessert composition of claim 12, wherein the frozen dessert composition has an overrun not greater than 100%.

17. The frozen dessert composition of claim 12, wherein the frozen dessert composition is soft and stable.

18. A frozen dessert composition comprising:
   (a) a sweetener composition comprising
      (i) sucrose in an amount ranging from 30 to 90 weight percent based on the total weight of the sweetener composition;

(ii) maltose in an amount ranging from 10 to 70 weight percent based on the total weight of the sweetener composition, wherein the sweetener composition has a sucrose to maltose ratio of at least 0.5;

(b) ice crystal size less than 100 micrometers in equivalent circular diameter after storage for four days at 20°F. (−7° C.); and (c) a penetration depth not less than 13 mm using a conical shaped weight of 45 g in five seconds at 10° F. (−12° C.).

19. A method for making a stable soft frozen dessert comprising steps of:

(a) forming a frozen dessert composition comprising a sweetener composition comprising (i) sucrose in an amount ranging from 30 to 90 weight percent based on the total weight of the sweetener composition;

(ii) maltose in an amount ranging from 10 to 70 weight percent based on the total weight of the sweetener composition, wherein the sweetener composition has a sucrose to maltose ratio of at least 0.5; and (b) freezing the frozen dessert composition (c) aerating said frozen dessert composition to produce a product with an overrun not greater than 100%.

20. The method of claim 18, wherein no sugar alcohol is added to the frozen dessert composition.

21. The method of claim 18, wherein no stabilizing gum is added to the frozen dessert composition.

* * * * *